Figure 1:
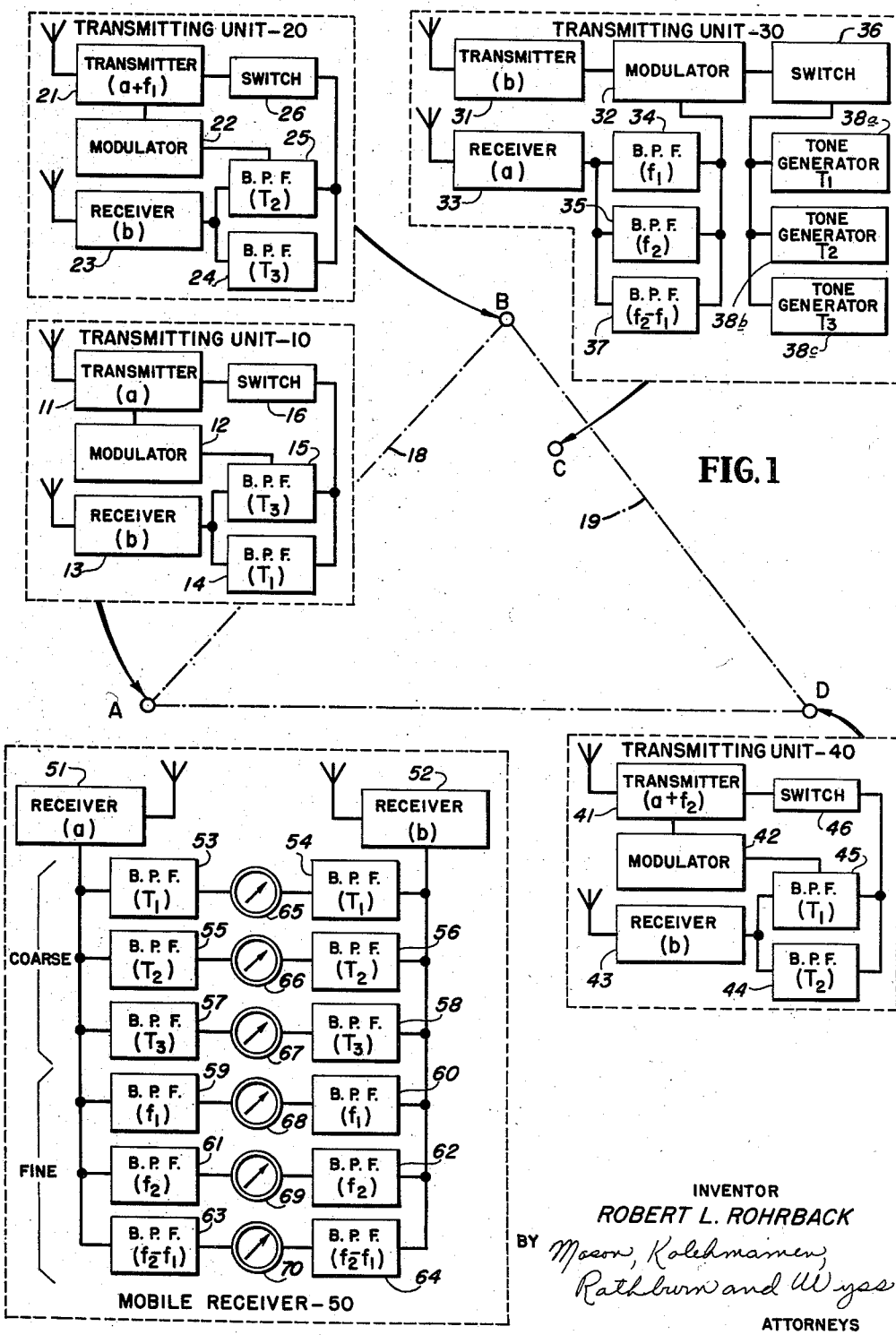

INVENTOR
ROBERT L. ROHRBACK

United States Patent Office 2,890,452
Patented June 9, 1959

2,890,452

AMBIGUITY RESOLUTION IN SWITCHED TYPE POSITION DETERMINING SYSTEMS

Robert L. Rohrback, Des Plaines, Ill., assignor to Seismograph Service Corporation, Tulsa, Okla., a corporation of Delaware Application July 9, 1956, Serial No. 596,482

20 Claims. (Cl. 343—105)

The present invention relates to radio position finding systems and more particularly to methods and apparatus for use in radio position finding systems employing phase comparison in pairs of position indication signals radiated from a plurality of spaced transmitting points to provide indications from which the position of a mobile receiving point relative to the known positions of the transmitting points may be determined.

In systems of the particular type referred to, the continuous waves radiated from each pair of transmitters when detected at the receiving point have a phase relationship which changes as a function of changing position between the two transmitting points. More specifically, the waves radiated by each pair of transmitting units of the system are characterized by spaced isophase lines which are hyperbolic in contour about the transmitting points as foci. On a line connecting the pair of transmitters, these isophase lines are spaced apart a distance equal to one half the mean wave length of the radiated waves and have diverging spacings at points on either side of this line. With this system arrangement, the position of a receiving point relative to a pair of hyperbolic isophase lines may be determined by measuring the phase relationship between continuous waves radiated from the pair of transmitters.

Since the point of location of the receiving point along the zone separating the two isophase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point. Systems of the character described are exceedingly accurate insofar as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation.

In Honore Patent No. 2,148,267 a system is disclosed in which the carrier waves of each pair of transmitters are heterodyned at a fixed link transmitting point, and the difference frequency component of the heterodyned waves is modulated as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines. In Hawkins and Finn U.S. Patent 2,513,-317 an improved system is disclosed wherein a pair of transmitters are alternately operated as link transmitters and as position signal transmitters thereby reducing the number of signal channels required. It is desirable that the channel frequencies employed be located adjacent the broadcast band or at least below the ultra-high frequency band in order to obviate the problem of line-of-sight transmission, which of course necessitates the location of a number of channel frequencies in the most crowded portion of the frequency spectrum, at least insofar as operations in the United States are concerned. Since frequency allocations in this band must be maintained at a minimum, it is highly desirable to provide a position determining system which reduces the number of channels required.

Another problem encountered in the operation of continuous wave systems is that of eliminating ambiguity from the phase measurements which provide the desired position information. Thus, while the two phase measurements identify the position of the receiving station relative to two intersecting pairs of hyperbolic isophase lines, they do not indicate the particular pairs of lines to which the indications are related. This means that in operating the system the geographic location of the receiving system must be known at the start of movement of the receiving system relative to the transmitting stations and, furthermore, that the successive wave lengths must be counted as the receiving station is moved relative to the grid-like pattern of hyperbolic lines. It also means that a mobile craft entering the radiation pattern of the transmitters cannot utilize the radiated signals to determine its position without employing auxiliary equipment to determine the approximate position of the craft relative to the signal transmitters.

It is an object of the present invention, therefore, to provide an improved radio location system of the above indicated type in which disadvantages pertaining to ambiguity are entirely obviated.

It is a further object of the present invention to provide an improved radio location system of the continuous wave type in which the above-mentioned difficulties in providing ambiguity resolution are eliminated and which at the same time combines economy of channel frequencies with minimum cost of the equipment.

It is another object of the invention to provide an improved radio location system of the continuous wave type employing alternate operation of the system transmitters in order to economize upon the number of channel frequencies employed and which affords a solution to the ambiguity problem.

It is a still further object of the present invention to provide improved transmitting equipment for use in radio location systems of the above-indicated character.

Figure 2:
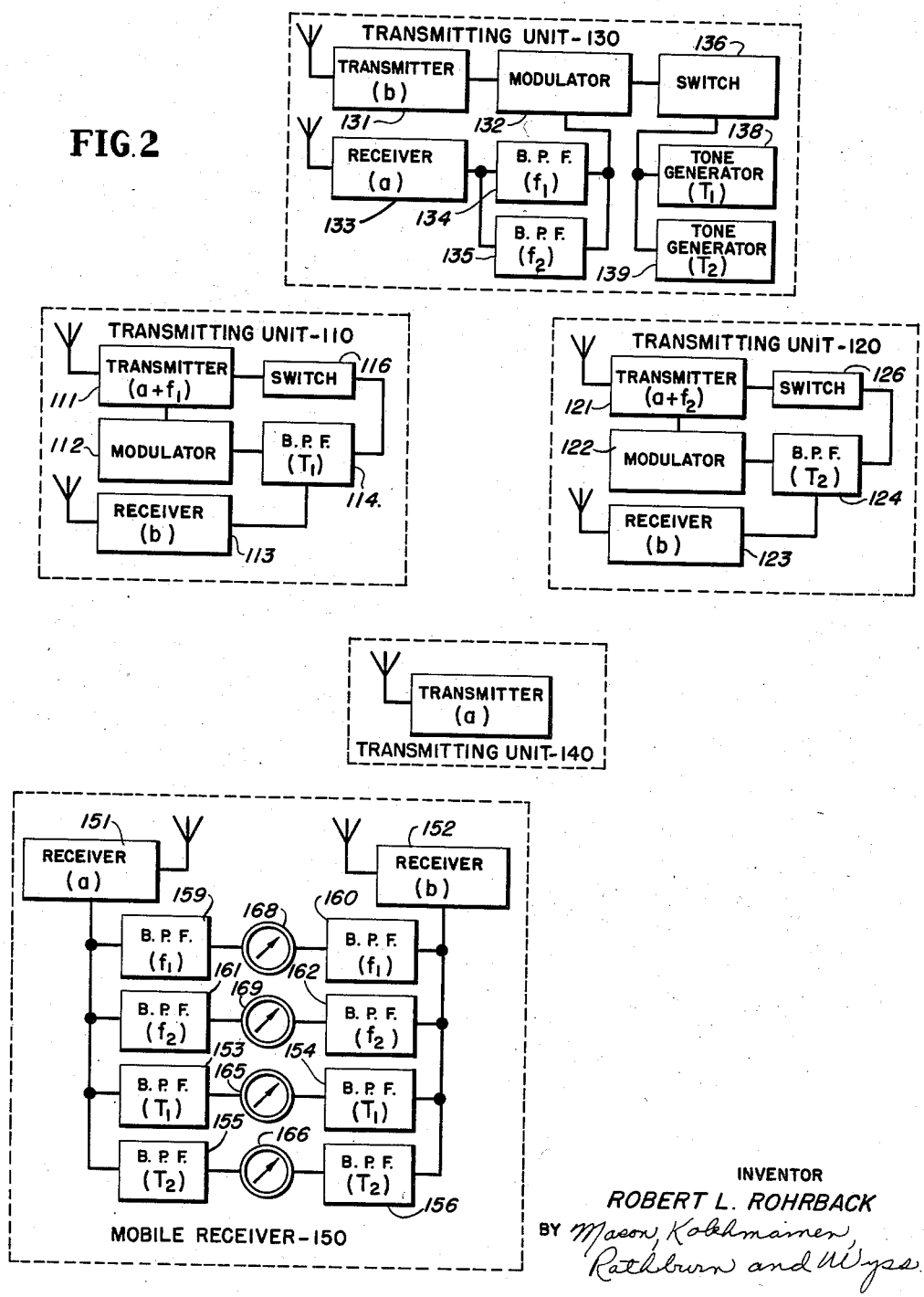

The invention, both as to its organization and method of operation, together with further objects and advantages thereof, will best be understood by reference to the specification, taken in conjunction with the accompanying drawings in which:

Fig. 1 diagrammatically illustrates transmitting and receiving equipment making up a three-foci position determining system characterized by the features of the present invention; and Fig. 2 is a diagrammatic illustration of an alternative construction of the transmitting and receiving equipment which may be employed in the practice of the present invention.

Referring now to Fig. 1 of the drawings, the invention is illustrated as embodied in a three-foci hyperbolic continuous wave system providing position information at any number of mobile receiving units 50 carried by vessels or vehicles operating within the radius of transmission of a plurality of spaced transmitting units or stations 10, 20, 30 and 40. The transmitting units 10, 20 and 40 are preferably spaced apart approximately equal distances and are so positioned that an imaginary base line 18 joining the points of location of the units 10 and 20 is angularly related to a similar base line 19 joining the points of location of the units 20 and 40. The transmitting unit 30 is preferably spaced from the other three units.

The four transmitting units cooperate to blanket the area in which they are located with signals which may be phase compared at the mobile receiver 50 to produce position indications representative of the location of the mobile receiver relative to the known positions of the transmitters. The transmitting unit 30 is adapted to radiate a carrier wave sequentially modulated during spaced apart intervals with tone switching signals of different frequency and with reference signals developed by heterodyning different pairs of waves radiated by the units 10, 20 and 40. The latter three units periodically radiate carrier waves of different frequency in response to the reception of tone switching signals received from the unit 30. The wave radiated by each of the units 10, 20 and 40 is modulated with its associated tone switching signal. At the mobile receiver unit the radiated waves are received and detected. The tone switching signals are employed to provide coarse or low phase sensitivity position indications and the reference signals are compared with heterodyne signals derived from the received carrier waves to obtain fine or high phase sensitivity position indications. The coarse indications, of course, may be employed to identify the approximate position of the mobile receiver, and hence, to resolve ambiguity of the fine position indications.

To effect the above-described operation, the equipment provided at the station 10 comprises a transmitter 11 for radiating a carrier wave having a frequency $a$, a modulator 12 for modulating the carrier wave radiated by the transmitter 11 with reference signals and with tone switching signals in a manner to be explained hereinafter, a heterodyning receiver 13 center tuned to frequency $b$ for receiving the wave radiated from the station 30 and for reproducing the tone modulation signals, a pair of band pass filters 14 and 15 respectively tuned to pass tone modulation signals having frequencies $T_1$ and $T_3$, a modulator 12 for modulating one of the tone modulation signals upon the wave radiated from station 10, and a normally open switch 16 which, in its deenergized condition, maintains the transmitter 11 inoperative but which, when energized by one of the tone modulation signals passed by the filters 14 and 15, turns on the transmitter 11. The receiver 13 is sufficiently selective to receive only the wave radiated from the unit 30 and to reject the waves radiated by each of the units 10, 20 and 40.

The transmitting unit 20 comprises equipment similar to that at the unit 10, the main distinction being that transmitter 21 at the unit 20 radiates carrier waves having a frequency of $(a+f_1)$, $f_1$ being a small audio difference frequency. Band pass filters 24 and 25 at the unit 20 are tuned to pass tone modulation signals having frequencies of $T_3$ and $T_2$, respectively. The equipment employed at the transmitting unit 40 is identical to that of the units 10 and 20 except that the transmitter 41 of the unit 40 radiates a carrier wave having a frequency of $(a+f_2)$, $f_2$, of course, being a small audio frequency different from $f_1$. Also the band pass filters 44 and 45 are respectively tuned to pass tone modulation signals having frequencies of $T_2$ and $T_1$.

Station 30 may be located in the position shown in Fig. 1 or may be oriented at any desired location, provided only that the waves radiated from this station are reliably received at all of the stations 10, 20 and 40 and at the mobile receiver 50. The equipment embodied in the transmitting unit 30 includes a transmitter 31 for radiating a signal having a frequency $b$ distinguishable from the frequency channel comprising frequencies $a$ $(a+f_1)$ and $(a+f_2)$. The unit 30 also includes a modulator 32 for modulating the carrier wave radiated by transmitter 31 both with reference signals and with tone modulation signals as described hereinafter. There is also provided at the unit 30 a plurality of tone generators 38a, 38b and 38c, respectively generating relatively low frequency tone switching signals having different frequencies $T_1$, $T_2$ and $T_3$ which are sequentially applied through switch 36 to the modulator 32. The switch 36 may be of the commutator type and intermittently passes the signals generated by the three tone generators to the modulator 32 at equal spaced intervals. The unit 30 also includes a receiver 33 tuned to accept and heterodyne in pairs the carrier waves of frequencies $a$ $(a+f_1)$ and $(a+f_2)$, radiated by the units 10, 20 and 40, together with band pass filters 34, 35 and 37 for separating the various beat frequency signals developed by the receiver 33. The receiver 33 is, of course, sufficiently selective to reject the wave of frequency $b$ radiated from the unit 30. The signals passed by the filters 34, 35 and 37 are applied to the modulator 32 for modulation upon the carrier wave radiated by transmitter 31.

The equipment embodied in the mobile receiver 50 comprises a receiver 51 tuned to receive all three of the signals in the frequency channel "$a$" radiated by the transmitter units 10, 20 and 40, and a receiver 52 tuned to receive the carrier wave of frequency $b$ radiated by the transmitter 31 at the unit 30. Band pass filters 53 to 64, inclusive, associated with the receivers 51 and 52 function to separate the various beat frequency signals passed by the band pass filters in order to produce low phase sensitivity or coarse position indications. Phase meters 68, 69 and 70, on the other hand, provide high phase sensitivity or fine position indications representative of the location of the mobile receiving unit.

Turning now to the operation of the system, it will be seen that during the first of the three transmitting intervals effected by operation of the switch 36 at the unit 30, the latter switch is operative to supply signals having a frequency $T_1$ from the tone generator 38a to the modulator 32 in order to modulate the carrier wave radiated by the transmitter 31. This modulated carrier wave is received by the receivers 13, 23 and 43 at the units 10, 20 and 40, respectively. The receiver 23 at the unit 20 reproduces the modulation signal of frequency $T_1$ but this signal is rejected by the band pass filters 24 and 25 with the result that the transmitter 21 remains inoperative during the first interval of operation. At the transmitting unit 10 the receiver 13 reproduces the tone modulation signal appearing on the wave received from transmitter 31 and having a frequency of $T_1$. This signal is passed through the band pass filter 14 to operate the switch 16 and place the transmitter 11 in operation and, accordingly, during the first interval of operation the latter transmitter radiates signals at the indicated frequency. The modulation signals having a frequency of $T_1$ developed by the receiver 13 are not passed to the modulator 12 and, accordingly, the carrier wave radiated from the unit 11 during the first interval of operation is a pure wave. At the transmitting unit 40 the receiver 43 receives the modulated carrier wave radiated by transmitter 31 and reproduces the tone modulation signal having a frequency of $T_1$. The latter modulation signal is passed through the band pass filter 45 to operate the switch 46 which, in its operated condition, places the transmitter 41 in operation. The tone modulation signal passed by the band pass filter 45 is also applied to the modulator 42 for modulation upon the carrier wave radiated by the transmitter 41.

At the transmitting unit 30, with the transmitters 11 and 41 in operation, the receiver 33 heterodynes the two carrier waves radiated by these transmitters and produces a beat frequency signal having a frequency of $f_2$. The latter beat frequency signal is rejected by filters 34 and 37 but is passed through band pass filter 35 to the modulator 32 for modulation upon the carrier wave radiated by the transmitter 31 simultaneously with the tone modulation signal from tone generator 38a. Thus, during the first transmitting interval the transmitter 21 at unit 20 is inoperative, the transmitter 11 at the transmitting unit 10 is effective to radiate an unmodulated wave of frequency $a$, the transmitter 41 at the unit 40 is effective to radiate a carrier wave of frequency $(a+f_2)$ modulated with tone signal $T_1$, and the transmitter 31 at the unit 30 radiates a carrier wave of frequency $b$ simultaneously modulated by a reference signal having a frequency $f_2$ and by a tone switching signal having frequency $T_1$.

The receiver 51 at the mobile receiving unit 50 responds to the carrier waves radiated by the transmitters 11 and 41 with two results. First of all, these two waves are heterodyned to generate a beat frequency of frequency $f_2$ which is passed through the band pass filter 61 to the left-hand set of input terminals of the phase meter 69 and, second, the tone modulation signal having a frequency of $T_1$ modulated upon the wave radiated by transmitter 41 is reproduced and passed through the band pass filter 53 to the left-hand set of input terminals of the phase meter 65. The receiver 52 at the mobile receiving unit reproduces both of the modulation signals appearing upon the carrier wave radiated by the transmitter 31. The tone modulation signal having a frequency $T_1$ is passed through the band pass filter 54 to the right-hand input terminals of the phase meter 65, while the reference signal having a frequency of $f_2$ is passed through the band pass filter 62 to the right-hand set of input terminals of the phase meter 69. As will be understood by those skilled in this art, the latter phase meter provides a phase measurement in accordance with the principles of the Honore patent referred to above in order to indicate the location of the mobile receiver unit with respect to hyperbolic isophase lines spaced relatively close together and having foci at stations 10 and 40.

The phase meter 65 provides a phase measurement of the relationship existing between the modulation signals of identical frequency $T_1$ appearing upon transmitters 31 and 41 and, as a result, this phase meter provides a low phase sensitivity indication representative of the location of the mobile receiving unit relative to widely spaced hyperbolic isophase lines having foci at the transmitting units 30 and 40. It will be recognized that the tone modulation signals modulated upon the waves radiated by transmitters 31 and 41 are effectively in phase synchronism due to the fact that the only difference in phase existing between the two modulation signals is a fixed phase displacement resulting from the transit time between stations and from any equipment-incurred displacement introduced at the unit 40. As a result, the phase between the tone switching signal modulated upon the transmitter 31 and signals of the same frequency modulated upon the transmitter 41 is practically constant during any particular transmitting interval and any change in the phase relationship measured by phase meter 65 results from a change in receiver position. The hyperbolic isophase lines to which the reading on the meter 65 pertain are spaced apart along a base line interconnecting the units 30 and 40 by a distance corresponding to one-half wave length of a signal having frequency $T_1$. Thus, the reading on the meter 65 is much less accurate than that appearing on meter 69 but the frequencies and other circuit components may be so selected that the error in the coarse phase meter reading is less than one fine lane, i.e., less than 360° phase difference appearing on meter 69. In this manner the meter 65 may be employed to locate the approximate position of the mobile receiver 50 in order to resolve ambiguity of the readings appearing on the meter 69.

At the end of the first transmitting interval described above, the switch 36 functions to terminate the modulation of signals from the tone generator 38a upon the wave radiated by the transmitter 31 with the result that the switches 16 and 46 at the units 10 and 40, respectively, return to their normally inoperative positions, and transmitters 11 and 41 are rendered inoperative. Immediately thereafter the switch 36 functions to apply signals generated by the tone generator 38b having a frequency of $T_2$ to the modulator 32 for modulation upon the carrier wave radiated by transmitter 31. This modulation signal is produced by receiver 13 at the unit 10 but, since the band pass filters 14 and 15 both reject signals having a frequency of $T_2$, the switch 16 remains in its normal position and the transmitter 11 is maintained inoperative.

At the transmitting unit 40 the tone modulation signal $T_2$ is reproduced, passed through band pass filter 44 and employed to operate the switch 46 in order to place the transmitter 41 in operation. The tone signal $T_2$ is not applied to the modulator 42 and, accordingly, during the second transmitting interval the transmitter 41 radiates a pure unmodulated carrier wave.

At the transmitting unit 20 the receiver 23 reproduces the tone modulation signal having a frequency $T_2$ and applies the same to the input terminals of the band pass filters 24 and 25. Filter 25 passes the signal to the switch 26 in order to place the transmitter 21 in operation and at the same time passes the tone modulation signal to the modulator 22 for modulation upon the carrier wave radiated by the transmitter 21. As a result, the transmitter 21 radiates a carrier wave modulated by a tone modulation signal having a frequency $T_2$ during the second transmitting interval.

At the unit 30 the receiver 33 heterodynes the carrier waves radiated by the transmitters 21 and 41 and reproduces a different or beat signal having a frequency $(f_2-f_1)$ which is passed through band pass filter 37 to the modulator 32 for modulation upon the carrier wave radiated by transmitter 31. Thus, during the second interval of operation the carrier wave radiated by the latter transmitter is simultaneously modulated with reference signals having a frequency $(f_2-f_1)$ with tone switching signals having a frequency $T_2$, the transmitting unit 10 is inoperative, the unit 20 radiates a carrier wave of frequency $(a+f_1)$ modulated with tone signal $T_2$, and the unit 40 radiates a pure wave of frequency $(a+f_2)$.

At the unit 50, the receiver 51 heterodynes the signals radiated by transmitters 21 and 41 and produces a beat frequency having a frequency $(f_2-f_1)$ which is applied through band pass filter 63 to the left-hand set of input terminals of phase meter 70. The receiver 51 also reproduces the modulation signal having a frequency $T_2$ modulated upon the carrier wave radiated by transmitter 21 and passes the same through the band pass filter 55 to the left-hand set of input terminals of the phase meter 66. The receiver 52 reproduces the reference signals having a frequency $(f_2-f_1)$ modulated upon the carrier wave radiated by transmitter 31 and passes the same through the band pass filter 64 to the right-hand input terminals of the phase meter 70. At the same time the receiver 52 reproduces the tone modulation signal having a frequency $T_2$ modulated upon the carrier wave radiated by transmitter 31 and passes this tone signal through the band pass filter 56 to the right-hand set of input terminals of the phase meter 66. As a result, the phase meter 66 provides a coarse position indication representative of the location of the mobile receiver unit relative to widely spaced hyperbolic isophase lines having foci at the stations 30 and 20. The phase meter 70 provides a high phase sensitivity or fine position indication representative of the location of the mobile receiver unit relative to closely spaced hyperbolic isophase lines having foci at the stations 20 and 40.

At the end of the second transmitting interval the switch 36 functions to interrupt the application of the $T_2$ tone signal to the modulator 32 with the result that the switches 26 and 46 at the units 20 and 40 revert to their normal positions and the transmitters 21 and 41 are rendered inoperative. Immediately thereafter the switch 36 functions to apply tone signals having a frequency $T_3$ from the tone generator 38c to the modulator 32 for modulation upon the carrier wave radiated by transmitter 31. These tone signals are reproduced by the receivers 13, 23 and 43 but the waves reproduced by the latter are ineffective to disturb the operation of the equipment at the transmitting unit 40 with the result that the transmitter 41 remains inoperative during this particular interval. At the unit 20 the tone signal having frequency $T_3$ is passed through band pass filter 24 to operate the switch 26 and place the transmitter 21 in operation. However, this tone signal is not applied to the modulator 22 and, accordingly, the carrier waves radiated by the transmitter 21 during this particular interval of operation are not modulated.

At the transmitting unit 10, the tone signal having frequency $T_3$ is passed through the band pass filter 15 to the modulator 12 and to the switch 16 with the result that the transmitter 11 is placed in operation to radiate a carrier wave of frequency $a$ modulated by a tone signal having a frequency $T_3$. At station 30 the waves radiated by transmitters 11 and 21 are heterodyned by receiver 33 in order to reproduce a beat frequency signal having a frequency $f_1$ which is passed through band pass filter 34 to the modulator 32. Thus, during the third transmitting interval the carrier wave radiated by transmitter 31 is simultaneously modulated with reference signals having a frequency $f_1$ and with tone signals having a frequency $T_3$.

At the mobile receiver unit the receivers 51 and 52 cooperate with filters 57 and 58 and phase meter 67 in the manner indicated above to produce a coarse position indication representative of the location of the mobile receiver unit relative to closely spaced hyperbolic lines having foci at the stations 10 and 20.

In view of the foregoing description it will be observed that receiver blocking problems are minimized in the described system, since at no station do a transmitter and receiver operate on the same channel. It will also be recognized that both coarse and fine position indications are provided using only two channel frequencies by obtaining three indications representative of three intersecting fine hyperbolic lines and three indications representative of three intersecting coarse hyperbolic lines. Moreover, wide area or full 360° radius coverage is provided by the described system using only two channels and four stations. While the frequencies used are not critical, complete ambiguity resolution could be provided by a proper frequency selection, that is, by using a ratio of about 30 to 1 between channel frequency "$a$" and the highest frequency tone signals. Thus, for example, one might select 100 kilocycles as the desired channel frequency and 3 kilocycles as the tone switching signal $T_3$. If band width reduction is desired or required, one of the side bands produced by each of the tone switching signals may be suppressed.

A second and somewhat simpler version of the present invention is shown in Fig. 2, wherein four spaced transmitting units are again employed. The unit 140 includes a single continuously operating transmitter operating at frequency $a$, while units 110 and 120 respectively include transmitters 111 and 121 operating intermittently at frequencies of $(a+f_1)$ and $(a+f_2)$. The latter transmitters are both normally inoperative and are turned on only when their associated switches 116 and 126 are energized by signals from band pass filters 114 and 124, respectively. The transmitting unit 130 includes a transmitter 131 continuously radiating a carrier wave of frequency $b$ which is alternately modulated through switch 136 and modulator 132 with tone switching signals having frequencies of $T_1$ and $T_2$ produced by tone generators 138 and 139, respectively. When the wave radiated by transmitter 131 is modulated with tone signal $T_1$, the receivers 113 and 123 at units 110 and 120 reproduce the modulation signal. However, the filter 124 rejects the reproduced modulation signal and maintains transmitter 121 inoperative throughout the first interval. The filter 114 passes the modulation signal $T_1$ to switch 116 in order to place transmitter 111 in operation to radiate a carrier wave modulated by $T_1$.

Receiver 133 at unit 130 heterodynes the signals from transmitters 111 and 140 to produce a beat frequency of $f_1$ which is passed through filter 134 to modulator 132 for modulation upon the wave radiated by transmitter 131. Thus, during the first interval unit 120 is inoperative, unit 110 radiates a carrier wave of frequency $(a+f_1)$ modulated with tone signal $T_1$ and unit 130 radiates a carrier wave of frequency $b$ simultaneously modulated with tone signal $T_1$ and with a reference signal of frequency $f_1$.

The mobile receiver unit 150 responds to the waves radiated by units 110, 130 and 140 to provide fine and coarse position indications in the manner described above.

Thus, the receiver 151 heterodynes the waves from units 110 and 140 and produces a beat frequency $f_1$ for application through filter 159 to the left-hand set of signal input terminals of phase indicator 168. The receiver 151 also detects the tone signal $T_1$ modulated upon the wave received from the unit 110 and passes this tone signal through band pass filter 153 to the left-hand set of input terminals of phase meter 165. Receiver 151 is, of course, sufficiently selective to reject the wave radiated by the transmitting unit 130. The latter wave is accepted by receiver 152, which functions to reproduce both of the modulation signals appearing thereon. The reference signal of frequency $f_1$ is passed through filter 160 to the right-hand set of input terminals of phase meter 168, while the tone signal of frequency $T_1$ is passed through the filter 154 to the right-hand set of input terminals of the phase meter 165. As will be understood by those skilled in this art, and particularly by reference to the above-identified Honore patent, the phase meter 168 provides a fine, or high phase sensitivity, position indication representative of the location of the mobile receiver unit 150 relative to closely spaced hyperbolic isophase lines having foci at the units 110 and 140. As previously indicated, the phase meter 165 responds to the tone modulation signals applied to its opposite sets of signal input terminals and produces a coarse, or low phase sensitivity, position indication representative of the location of the mobile receiver unit 150 relative to widely spaced hyperbolic isophase lines having foci at the units 110 and 130. The accuracy of the phase meter indications provided by the meter 165 is preferably sufficient to locate the mobile receiver unit within one fine land, thereby resolving the ambiguity of the indications provided by phase meter 168.

At the end of the first transmitting interval described above, the switch 136 interrupts the application of tone signals from generator 138 to the modulator 132. In the absence of tone signals of frequency $T_1$, the switches 116 and 126 at the units 110 and 120, respectively, return to their normally open positions. The switch 136 then initiates the second transmitting interval by applying the signals from tone generator 139 to the modulator 132 so that the carrier wave radiated by transmitter 131 is modulated with a tone signal of frequency $T_2$. The $T_2$ tone signal is reproduced by each of the receivers 113 and 123 at the units 110 and 120, respectively. Band pass filter 114 at the unit 110 rejects the reproduced tone signal with the result that the unit 110 remains inoperative during the second transmitting interval. The tone signal $T_2$ produced by receiver 123 is applied through band pass filter 124 to the switch 126 to place the transmitter 121 in operation and is also applied to the modulator 122, so that, during the second transmitting interval, the wave radiated from the unit 120 is modulated with tone signals having a frequency $T_2$.

Receiver 151 at the mobile receiver unit heterodynes the two carriers radiated by the units 120 and 140 and produces a beat frequency $f_2$ which is passed through filter 161 to the left-hand set of signal input terminals of phase meter 169. The receiver 151 also detects and reproduces the $T_2$ tone signals modulated upon the wave radiated from the unit 120 and passes this tone signal through filter 155 to the phase indicating device 166. Receiver 152 reproduces both of the modulation components appearing on the wave radiating from the unit 130, so that the tone signal of frequency $T_2$ is applied through filter 156 to the right-hand set of input terminals of the phase meter 166, while the reference signal of frequency $f_2$ is applied through filter 162 to the right-hand set of signal input terminals of the phase meter 169. As previously indicated, the latter phase meter measures the phase relationship between the two signals applied to its opposite sets of input terminals to provide a fine, or high phase sensitivity, position indication representative of the location of the mobile receiver unit 150 relative to closely spaced hyperbolic isophase lines having foci at the units 120 and 140. The phase meter 166 functions in the manner previously described to measure the phase relationship between the two tone signals applied to its opposite sets of signal input terminals and, hence, provides a coarse, or low phase sensitivity, position indication representative of the location of the mobile receiver unit relative to widely spaced hyperbolic isophase lines having foci at the units 120 and 130. Again, the accuracy of the indications provided by the meter 166 is sufficient to identify the location of the receiver unit within one fine lane of the fine indications provided by the meter 169, thus resolving the ambiguity in the latter indications.

In view of the foregoing description, it will be recognized that the system shown in Fig. 2 is similar to that shown in Fig. 1, in that in both systems only four stations and two frequency channels are required to effect the fine and coarse position indications. The system shown in Fig. 2 differs from that shown in Fig. 1 in that in the former only two fine and two coarse indications are provided, while in the latter three fine and three coarse indications are provided. Both systems are characterized by the fact that the coarse indications are derived from the switching signals employed to energize the transmitting units of the system.

While particular embodiments of the invention have been shown, it will be understood, of course, that the invention is not limited thereto, since many modifications may be made, and it is therefore contemplated by the appended claims to cover any such modifications as fall within the true spirit and scope of the invention.

What is claimed as new and desired to be secured by Letters Patent of the United States is:

1. In a wave signal transmitting system of the hyperbolic continuous wave type, the combination of first and second spaced apart transmitting stations respectively radiating first and second carrier waves of different frequency, means at the first station for modulating said first carrier wave during spaced apart intervals with a switching signal, means responsive to said switching signal for controlling the radiation of said second carrier wave from said second station, and means for modulating said second carrier wave with a low frequency signal derived from said switching signal.

2. In a wave signal transmitting system of the hyperbolic continuous wave type, the combination of first and second spaced apart, fixedly positioned, transmitting stations respectively radiating first and second carrier waves of different frequency, means at the first station for modulating said first carrier wave during spaced apart intervals with a switching signal, means normally maintaining said second transmitting station inoperative, means responsive to said switching signal for controlling the last named means to effect radiation of said second carrier wave from said second station, and means for modulating said second carrier wave with said switching signal.

3. In a wave signal transmitting system of the hyperbolic continuous wave type, the combination of first transmitting stations for continuously radiating a first carrier wave, a normally inoperative second transmitting station spaced from said first station for radiating a second carrier wave differing in frequency from the first wave, means at the first station for modulating said first carrier wave during spaced apart intervals with a switching signal, means responsive to said switching signal for rendering the second station operative to effect the radiation of said second carrier wave, and means for modulating said second carrier wave with a low frequency signal derived from said switching signal.

4. In a wave signal transmitting system of the hyperbolic continuous wave type, the combination of first and second spaced apart transmitting stations respectively radiating first and second carrier waves of different frequency, means at the first station for modulating said first carrier wave during spaced apart intervals with a switching signal, means at said second station for detecting said first wave and reproducing said switching signal, means responsive to the reproduced switching signal for controlling the radiation of said second carrier wave from said second station, and means for modulating said second carrier wave with a low frequency signal derived from said switching signal.

5. In a wave signal transmitting system of the hyperbolic continuous wave type, the combination of a first continuously operative transmitting station and a second normally inoperative transmitting station spaced from the first station for respectively radiating first and second carrier waves of different frequency, means at the first station for modulating said first carrier wave during spaced apart intervals with a switching signal, means at said second station for detecting said first wave and reproducing said switching signal, means responsive to the reproduced switching signal for rendering said second station operative to radiate said second carrier wave, and means for modulating said second carrier wave with said switching signal.

6. In a wave signal transmitting system of the hyperbolic continuous wave type, the combination of a plurality of spaced apart transmitting stations radiating waves of different frequency, means at a first of said stations for periodically modulating the wave radiated therefrom with switching signals of different frequency during spaced intervals, means responsive to a first of said switching signals for rendering a second of said stations operative to radiate its wave during the interval when the first switching signal is modulated upon the wave radiated from said first station, means at said second station for modulating the wave radiated from the second station with a low frequency signal derived from said first switching signal, means responsive to a second of said switching signals for rendering a third of said stations operative to radiate its wave during the interval when the second switching signal is modulated upon the wave radiated from said first station, and means at said third station for modulating the wave radiated from said third station with a low frequency signal derived from said second switching signal.

7. In a wave signal transmitting system of the hyperbolic continuous wave type, the combination of a plurality of spaced apart transmitting stations radiating waves of different frequency, a first of said stations continuously operative to radiate a carrier wave and a second and a third of said stations being normally inoperative, means at the first station for periodically modulating the wave radiated therefrom with switching signals of different frequency during spaced intervals, means at the second station responsive to a first of said switching signals for rendering the second station operative to radiate its wave during the interval when the first switching signal is modulated upon the wave radiated from said first station, means at said second station for modulating said first switching signal upon the wave radiated from the second station, means at the third station responsive to a second of said switching signals for rendering the third station operative to radiate its wave during the interval when the second switching signal is modulated upon the wave radiated from said first station, and means at said third station for modulating said second switching signal upon the wave radiated from said third station.

8. In a wave signal transmitting system of the hyperbolic continuous wave type, the combination of a plurality of spaced apart transmitting stations radiating waves of different frequency, means at a first of said stations for periodically modulating the wave radiated therefrom with switching signals of different frequency during spaced intervals, receiving means at a second of said stations for receiving the wave radiated from the first station and reproducing the switching signal, means at said second station responsive to a first of said switching signals for rendering the second station operative to radiate its wave during the interval when the first switching signal is modulated upon the wave radiated from said first station, means at said second station for modulating the wave radiated from said second station with a low frequency signal derived from said first switching signal, receiving means at a third of said stations for receiving the wave radiated from said first station and for reproducing the switching signals, means at said third station responsive to a second of said switching signals for rendering the third station operative to radiate its wave during the interval when the second switching signal is modulated upon the wave radiated from said first station, and means at said third station for modulating the wave radiated from said third station with a low frequency signal derived from said second switching signal.

9. In a wave signal transmitting system of the hyperbolic continuous wave type, the combination of a plurality of spaced apart transmitting stations radiating waves of different frequency, a first of said stations being continuously operative to radiate a carrier wave and a second and a third of said stations each being normally inoperative, means at the first station for periodically modulating the wave radiated therefrom with switching signals of different frequency during spaced intervals, receiving means at the second station for receiving the wave radiated from the first station and reproducing the switching signal, means at said second station responsive to a first of said switching signals for rendering the second station operative to radiate its wave during the interval when the first switching signal is modulated upon the wave radiated from said first station, means at said second station for modulating the wave radiated from said second station with said first switching signal, receiving means at the third station for receiving the wave radiated from said first station and for reproducing the switching signals, means at said third station responsive to a second of said switching signals for rendering the third station operative to radiate its wave during the interval when the second switching signal is modulated upon the wave radiated from said first station, and means at said third station for modulating the wave radiated from said third station with said second switching signal.

10. The transmitting system defined by claim 6 wherein a fourth transmitting station is provided comprising a transmitter continuously radiating a wave differing in frequency from those radiated from the second and third stations, said first station including means for heterodyning the wave radiated by the fourth station with those radiated by the second and third stations during the different intervals when the latter waves are radiated in order to produce first and second beat frequency signals, and means for modulating the wave radiated by the first station with first and second reference signals having frequencies respectively derived from said first and second beat frequency signals.

11. The transmitting system defined by claim 8 wherein a fourth transmitting station is provided comprising a transmitter continuously radiating a wave differing in frequency from those radiated from the second and third stations, said first station including means for heterodyning the wave radiated by the fourth station with those radiated by the second and third stations during the different intervals when the latter waves are radiated in order to produce first and second beat frequency signals, and means for modulating the wave radiated by the first station with first and second reference signals having frequencies respectively derived from said first and second beat frequency signals.

12. In a position determining system of the hyperbolic continuous wave type for locating the position of a mobile receiver unit, the combination of first and second fixed transmitting stations respectively radiating first and second carrier waves, means at the first station for modulating said first carrier wave during spaced apart intervals with a switching signal, means responsive to said switching signal for controlling the radiation of said second carrier wave from said second station, means for modulating said second carrier wave with a low frequency signal derived from said switching signal, and means at said mobile receiver unit jointly responsive to the switching signal modulated upon the first carrier wave and the low frequency signal modulated upon the second carrier wave for providing a coarse position indication representative of the location of said mobile receiver unit relative to said first and second stations.

13. In a position determining system of the hyperbolic continuous wave type for locating the position of a mobile receiver unit, the combination of first and second spaced apart fixed transmitting stations respectively radiating first and second carrier waves of different frequency, the first station being continuously operative and the second station being normally inoperative, means at the first station for modulating said first carrier wave during spaced apart intervals with a switching signal, means at said second station for receiving said first carrier wave and reproducing said switching signal, means responsive to the reproduced switching signal for controlling the radiation of said second carrier wave from said second station, means for modulating said switching signal upon said second carrier wave, and means at said mobile receiver unit jointly responsive to the switching signal modulated upon the first carrier wave and the switching signal modulated upon the second carrier wave for providing a coarse position indication representative of the location of said mobile receiver unit relative to said first and second stations.

14. In a position determining system of the hyperbolic continuous wave type for locating the position of a mobile receiver unit, the combination of a plurality of spaced apart transmitting stations radiating waves of different frequency, means at a first of said stations for periodically modulating the wave radiated therefrom with switching signals of different frequency during spaced intervals, means responsive to a first of said switching signals for maintaining a second of said stations operative to radiate its wave during the interval when the first switching signal is modulated upon the wave radiated from said first station, means at said second station for modulating the wave radiated from the second station with a low frequency signal derived from said first switching signal, means responsive to a second of said switching signals for maintaining a third of said stations operative to radiate its wave during the interval when the second switching signal is modulated upon the wave radiated from said first station, means at said third station for modulating the wave radiated from the third station with a low frequency signal derived from said second switching signal, means at said mobile receiver unit jointly responsive to the first switching signal modulated upon the first carrier wave and the low frequency signal modulated upon the wave radiated from said second station for providing a first coarse position indication representative of the location of said mobile receiver unit relative to said first and second stations, and means at said mobile receiver unit jointly responsive to the second switching signal modulated upon the first carrier wave and the low frequency signal modulated upon the wave radiated from said third station for providing a second coarse position indication representative of the location of said mobile receiver unit relative to said first and third stations.

15. The position determining system defined by claim 14 which additionally includes a fourth transmitting station continuously radiating a wave differing in frequency from those radiated by the second and third stations by relatively low frequency differences, said first station including means for heterodyning the wave radiated by the fourth station with those radiated by the second and third stations during the different intervals when the latter waves are radiated in order to produce first and second beat frequency signals, means for modulating the wave radiated from the first station with first and second reference signals respectively derived from said first and second beat frequency signals, means at said mobile receiver unit jointly responsive to said first reference signal and to the waves radiated from said second and fourth stations for providing a first fine position indication representative of the location of the mobile receiver unit relative to said second and fourth stations, and means at said mobile receiver unit jointly responsive to said second reference signal and to the waves radiated from said third and fourth stations for providing a second fine position indication representative of the location of the mobile receiver unit relative to said third and fourth stations.

16. In a wave signal transmitting system of the hyperbolic continuous wave type, the combination of a first transmitting unit for continuously radiating a first carrier wave, means for periodically modulating said first carrier wave with tone switching signals of different frequency during spaced intervals, three additional transmitters respectively radiating second, third and fourth signals of different frequencies distinguishable from said first carrier wave, means responsive at least in part to said tone switching signals for rendering two of said additional transmitters operative during each interval and for rendering the other transmitter inoperative, means for modulating a first of the tone switching signals produced during a first of said intervals upon the signal radiated by one of the transmitters operative during the first interval, means for modulating a second of the tone switching signals produced during a second of said intervals upon the signal radiated by a different transmitter operative during the second interval, and means at said first unit for heterodyning the signals radiated by the operative pair of transmitters during each interval in order to develop beat frequency signals and for modulating said first carrier wave with reference signals having frequencies related to said beat frequency signals.

17. In a position determining system of the hyperbolic continuous wave type for locating the position of a mobile receiver unit relative to the known positions of at least four spaced apart fixed transmitting stations, the combination of a first unit at a first of said stations for continuously radiating a first carrier wave, means for periodically modulating said first carrier wave with tone switching signals of different frequency during spaced intervals, three additional transmitters disposed at the other three stations for respectively radiating signals of different frequency distinguishable from said first carrier wave, means responsive at least in part to said tone switching signals for rendering two of said additional transmitters operative during each interval and for rendering the other transmitter inoperative, means for modulating a first of the tone switching signals produced during a first of said intervals upon the signal radiated by one of the transmitters operative during the first interval, means for modulating a second of the tone switching signals produced during a second of said intervals upon the signal radiated by a different transmitter operative during the second interval, means at said first unit for heterodyning the signals radiated by the two transmitters operative during each interval to develop beat frequency signals and for modulating said first carrier wave with reference signals derived from said beat frequency signals, means jointly responsive to the first tone switching signal modulated upon the wave radiated by said first unit and to the first tone switching signal modulated upon the wave radiated by said one transmitter during the first of said intervals for producing a first coarse position indication representative of the location of said mobile receiver unit relative to a first pair of said stations, means jointly responsive to the second tone switching signal modulated upon the wave radiated by said first unit and to the second tone switching signal modulated upon the wave radiated by said different transmitter during the second of said intervals for producing a second position indication representative of the location of the mobile receiver unit relative to a second pair of said stations, means responsive to the two additional transmitters operative during the first of said intervals and to a first of said reference signals for producing a first fine position indication representative of the location of said mobile receiver unit relative to a third pair of said stations, and means responsive to a second of said reference signals and to the waves radiated by the two additional transmitters operative during the second interval for producing a second fine position indication representative of the location of the mobile receiver unit relative to a fourth pair of said stations.

18. The wave transmitting system defined by claim 16 wherein one of said additional transmitters is a continuously operative transmitter and the other two of said additional transmitters are rendered alternately operative in response to said first and second tone switching signals.

19. In a wave signal transmitting system of the hyperbolic continuous wave type, the combination of a first transmitting unit for continuously radiating a first carrier wave, means for periodically modulating said first carrier wave with first, second and third tone switching signals of different frequency during three different intervals, three additional transmitters spaced from each other and from said first unit for respectively radiating second, third and fourth signals of different frequency distinguishable from said first carrier wave, receiving means at each of said additional transmitters for receiving said first wave and reproducing the tone switching signals, means responsive to the first tone switching signal for rendering a first and second of said additional transmitters operative during a first of said intervals, means for modulating said first signal with said first tone switching signal during said first interval, means responsive to the second tone switching signal for rendering the second and third of said additional transmitters operative during the second of said intervals, means at the second additional transmitter for modulating said second signal with said second tone switching signal during said second interval, means responsive to the third tone switching signal for rendering said first and third additional transmitters operative during the third of said intervals, means at the third additional transmitter for modulating said third signal with said third tone switching signal, means at said first unit for heterodyning the two signals radiated during each of said intervals in order to produce first, second and third beat frequency signals, and means for sequentially modulating said first carrier wave with first, second and third reference signals respectively derived from said first, second and third beat frequency signals during said first, second and third intervals.

20. In a position determining system of the hyperbolic continuous wave type for locating the position of a mobile receiver unit relative to the known positions of four spaced apart transmitting stations, the combination of a first transmitting unit at a first of said stations for continuously radiating a first carrier wave; means for periodically modulating said first carrier wave with the first, second and third tone switching signals of different frequency during first, second and third spaced intervals; second, third and fourth transmitters respectively disposed at the other three stations for respectively radiating second, third and fourth signals of different frequency distinguishable from said first carrier wave; means responsive to the first tone switching signal for rendering said second and third transmitters operative during the first interval; means for modulating said second signal with said first tone switching signal during said first interval; means responsive to said second tone switching signal for rendering said third and fourth transmitters operative during said second interval; means for modulating said third signal with said second tone switching signal during said second interval; means responsive to said third tone switching signal for rendering said second and fourth transmitters operative during said third interval; means for modulating said fourth signal with the third tone switching signal during said third interval; means at said first unit for heterodyning the two signals radiated by the operative pair of transmitters during each of said three intervals in order to develop first, second and third beat frequency signals; means for sequentially modulating said first carrier wave with first, second and third reference signals respectively derived from said first, second and third beat frequency signals during said first, second and third intervals; means jointly responsive to the tone switching signal modulated upon said first carrier wave and the tone switching signal modulated upon said second signal for producing a first coarse position indication representative of the location of the mobile receiver unit relative to said first and second stations; means jointly responsive to the second tone switching signal modulated upon said first carrier wave and the second tone switching signal modulated upon said third signal for producing a second coarse position indication representative of the location of the mobile receiver unit relative to said first and third stations; means responsive to the first reference signal and to the signals radiated by said second and third transmitters for producing a first fine position indication representative of the location of the mobile receiver unit relative to said second and third stations; and means responsive to said second reference signal and to the waves radiated by said third and fourth transmitters for producing a second fine position indication representative of the location of the mobile receiver unit relative to said third and fourth stations.

No references cited.